(12) United States Patent
Nam et al.

(10) Patent No.: US 9,586,474 B2
(45) Date of Patent: Mar. 7, 2017

(54) AIR DUCT AND COOLING SYSTEM FOR VEHICLE

(71) Applicant: Hyundai Motor Company, Seoul (KR)

(72) Inventors: JongWoo Nam, Seoul (KR); Hyun Cho, Seoul (KR); JoonHo Lee, Seoul (KR); HanShin Chung, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 46 days.

(21) Appl. No.: 14/514,059

(22) Filed: Oct. 14, 2014

(65) Prior Publication Data

US 2015/0101550 A1    Apr. 16, 2015

(30) Foreign Application Priority Data

Oct. 14, 2013  (KR) .................. 10-2013-0122238

(51) Int. Cl.
| | |
|---|---|
| *F01P 3/18* | (2006.01) |
| *F01P 11/10* | (2006.01) |
| *B60K 11/08* | (2006.01) |
| *B60K 11/04* | (2006.01) |
| *F01P 7/02* | (2006.01) |
| *B60K 13/02* | (2006.01) |

(52) U.S. Cl.
CPC .............. *B60K 11/08* (2013.01); *B60K 11/04* (2013.01); *B60K 13/02* (2013.01); *F01P 7/02* (2013.01); *F01P 2003/187* (2013.01)

(58) Field of Classification Search
CPC .............. F02B 29/0412; F02B 29/0475; F02B 29/0437; F01P 2060/02; F01P 3/20; F01P 2050/04; F01P 2003/185; F01P 5/06; F01P 7/02; F01P 7/14

USPC ............ 123/41.33, 41.31, 41.01, 41.29, 41.3
See application file for complete search history.

(56) References Cited

U.S. PATENT DOCUMENTS

| | | | | |
|---|---|---|---|---|
| 4,273,082 A | * | 6/1981 | Tholen | ..................... F01P 11/08 |
| | | | | 123/41.31 |
| 4,706,615 A | * | 11/1987 | Scadding | ................. F01P 11/10 |
| | | | | 123/198 E |
| 4,723,594 A | * | 2/1988 | Koehr | ..................... B60K 11/04 |
| | | | | 123/196 AB |
| 5,408,843 A | * | 4/1995 | Lukas | .................. B60H 1/3227 |
| | | | | 62/244 |
| 6,561,169 B2 | * | 5/2003 | Sealy | ...................... F02B 27/02 |
| | | | | 123/559.1 |

(Continued)

FOREIGN PATENT DOCUMENTS

| | | |
|---|---|---|
| JP | 2006-306226 A | 11/2006 |
| JP | 5240444 B2 | 7/2013 |
| KR | 10-2004-0020576 A | 3/2004 |

*Primary Examiner* — Long T Tran
(74) *Attorney, Agent, or Firm* — Morgan, Lewis & Bockius LLP

(57) ABSTRACT

An air duct for a vehicle may include a front duct formed forward to take in an exterior air in front of the vehicle, a rear duct formed relatively rearward from the front duct such that the exterior air flowing via the front duct passes therein, and a duct outlet flowing out the exterior air flowed via the rear duct, wherein the air duct may be disposed at both sides of an exterior air intake port taking in the exterior air in front of the vehicle into an engine compartment, and wherein both front ducts may be formed to be bent such that extension lines thereof form a streamlined shape in front of the vehicle.

9 Claims, 5 Drawing Sheets

(56) References Cited

U.S. PATENT DOCUMENTS

| | | | |
|---|---|---|---|
| 2009/0025993 A1* | 1/2009 | Hines .................... | B62D 35/00 180/68.3 |
| 2012/0071075 A1* | 3/2012 | Wolf ........................ | B60T 5/00 454/162 |
| 2012/0152212 A1* | 6/2012 | Bauer ................. | F02B 29/0462 123/542 |

\* cited by examiner

AIR DUCT AND COOLING SYSTEM FOR VEHICLE

CROSS-REFERENCE TO RELATED APPLICATION

The present application claims priority to and the benefit of Korean Patent Application No. 10-2013-0122238 filed on Oct. 14, 2013, the entire contents of which is incorporated herein for all purposes by this reference.

BACKGROUND OF THE INVENTION

Field of the Invention

The present invention relates to an air duct and a cooling system for a vehicle. More particularly, the present invention relates to an air duct and a cooling system for a vehicle for improving cooling performance and aerodynamic performance.

Description of Related Art

Generally, an air duct is a passage through which air passes, and is a pipe for guiding air to parts requiring air from a part through which air can easily flow inside.

For example, there are an air duct that guides air to be sucked into an engine and an air duct for cooling a brake system.

Recently, techniques for preserving temperature of an engine and minimizing fuel consumption at the time of initial starting of the engine have been actively developed.

However, cooling of an engine may not be performed well, fuel consumption may be deteriorated during high speed driving, and heat damage may be generated to components which are disposed to a periphery of an exhaust passage at a high temperature if only the method for preserving temperature of an engine is performed. In addition, the performance of cooling an engine and fuel consumption may be deteriorated, and the heat damage may be become serious if air flowing through a radiator grille is interfered with by ancillary machinery disposed to the periphery of an engine.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an air duct and a cooling system for a vehicle having advantages of improving cooling performance.

In addition, various aspects of the present invention are directed to providing an air duct and a cooling system for a vehicle having a further advantage of improving aerodynamic performance by countervailing interference of a vehicle body, ancillary machinery, a wheel, and so on against air flow.

In an aspect of the present invention, an air duct for a vehicle may include a front duct formed forward to take in an exterior air in front of the vehicle, a rear duct formed relatively rearward from the front duct such that the exterior air flowing via the front duct passes therein, and a duct outlet flowing out the exterior air flowed via the rear duct, wherein the air duct is disposed at both sides of an exterior air intake port taking in the exterior air in front of the vehicle into an engine compartment, and wherein both front ducts are formed to be bent such that extension lines thereof form a streamlined shape in front of the vehicle.

Both rear ducts are gradually more bent to be respectively headed for wheels toward the rear direction of the vehicle.

A guide plate which guides a direction of air flow such that the air flow is guided toward the wheels is provided to the duct outlet.

The duct outlet is integrally formed with a wheel house configured to cover the wheels, and the guide plate is mounted to the wheel house.

The guide plate guides the direction of the air flow such that air flowed out through the duct outlet forms an air curtain in front of the wheels and the air forming the air curtain in front of the wheels is directed by a set angle for maximizing an effect of the air curtain at a side surface of the wheels.

The air duct may further include cooling constituent elements which are disposed at an interior thereof, by passing air through the interior thereof.

In an aspect of the present invention, a cooling system for a vehicle may include at least two air ducts formed at respective sides of an exterior air intake port taking in an exterior air in front of the vehicle to an engine compartment, and taking in the exterior air in front of the vehicle to flow the exterior air out toward a wheel, a first low temperature radiator disposed inside of one of the at least two air ducts and adapted to release heat of a coolant into the air, a second low temperature radiator disposed inside of the other of the at least two air ducts and adapted to release heat of the coolant into the air, a turbocharger generating a compressed air to supply the compressed air to an engine, and an intercooler cooling the compressed air generated from the turbocharger by using coolant flowed via at least one of the first and second low temperature radiators.

The intercooler may include a first intercooler and a second intercooler, and repeated circulation of coolant which circulates via the first low temperature radiator and the first intercooler and repeated circulation of coolant which circulates via the second low temperature radiator and the second intercooler are independently realized.

The cooling system may further include a first water pump pumping coolant flowing via the first low temperature radiator to be supplied to the first intercooler to realize the repeated circulation of the coolant which circulates via the first low temperature radiator and the first intercooler, and a second water pump pumping the coolant flowing via the second low temperature radiator to be supplied to the second intercooler to realize the repeated circulation of coolant which circulates via the second low temperature radiator and the second intercooler.

Coolant flowing via the first and second low temperature radiators heat-exchanges with air passing through the air duct in which the first and second low temperature radiators are respectively disposed.

Repeated circulation of coolant which sequentially passes through the first low temperature radiator, the intercooler, and the second low temperature radiator is realized.

The cooling system may further include a water pump pumping coolant flowing via the first low temperature radiator to be supplied to the intercooler to realize the repeated circulation of coolant which sequentially passes through the first low temperature radiator, the intercooler, and the second low temperature radiator.

Coolant sequentially passing through the first low temperature radiator, the intercooler, and the second low temperature radiator flows via a high temperature radiator which is disposed at the exterior air intake port and is adapted to release heat of coolant for cooling the engine into the air, and heat-exchanges with air passing through the exterior air intake port and coolant for cooling the engine.

The intercooler may include at least two intercoolers, and the repeated circulation of coolant which sequentially passes through the first low temperature radiator, the at least two intercoolers, and the second low temperature radiator is realized.

The cooling system may further include a water pump pumping coolant flowing via the first low temperature radiator to be supplied to one of the at least two intercoolers to realize the repeated circulation of coolant which passes through the first low temperature radiator, the at least two intercoolers, and the second low temperature radiator.

Coolant sequentially passing through the first low temperature radiator, the at least two intercoolers, and the second low temperature radiator flows via a high temperature radiator which is disposed at the exterior air intake port and is adapted to release heat of coolant for cooling the engine into the air, and heat-exchanges with air passing through the exterior air intake port and coolant for cooling the engine.

In another aspect of the present invention, a cooling system for a vehicle, may include at least two air ducts formed at respective sides of an exterior air intake port taking in an exterior air in front of the vehicle to an engine compartment, and taking in the exterior air in front of the vehicle to flow out the exterior air toward a wheel, a low temperature radiator disposed inside of one of the at least two air ducts and adapted to release heat of coolant into the air, an oil cooler disposed inside of the other one of the at least two air ducts and adapted such that engine oil is cooled by passing therethrough, a turbocharger generating compressed air to supply the compressed air to the engine, and an intercooler cooling the compressed air generated from the turbocharger by using coolant flowing via the low temperature radiator.

A repeated circulation of coolant which flows via the low temperature radiator and the intercooler is realized.

The cooling system may further include a water pump pumping coolant flowed via the low temperature radiator to be supplied to the intercooler to realize the repeated circulation of coolant which flows via the low temperature radiator and the intercooler.

Coolant, which flows via the low temperature radiator, heat-exchanges with air passing through the one air duct in which the low temperature radiator is disposed, and oil, which flows via the oil cooler, heat-exchanges with air passing through the other air duct in which the oil cooler is disposed.

The information disclosed in this Background of the Invention section is only for enhancement of understanding of the general background of the invention and should not be taken as an acknowledgement or any form of suggestion that this information forms the prior art already known to a person skilled in the art.

Figure 1:
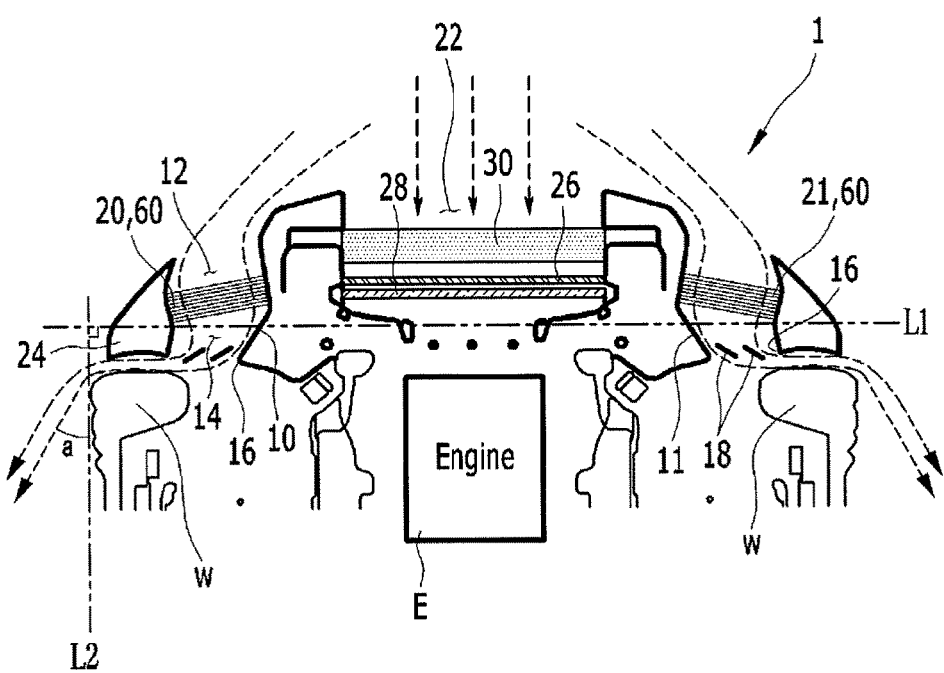
FIG. 1 is a basic schematic diagram of a cooling system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a basic schematic diagram of a cooling system according to an exemplary embodiment of the present invention.

As shown in FIG. 1, a cooling system 1 according to an exemplary embodiment of the present invention an exterior air intake port 22 and air ducts 10 and 11.

The exterior air intake port 22 is an air passage such as a radiator grille which receives exterior air in front of a vehicle to flow into an engine compartment.

Air passing through the exterior air intake port 22 cools an intercooler 30, a condenser 26, and a high temperature radiator 28, and flows into the engine compartment. That is, the intercooler 30, the condenser 26, and the high temperature radiator 28 are disposed at the exterior air intake port 22. Herein, the intercooler 30 is an apparatus for cooling air which flows into turbochargers 42 and 44 (see FIG. 2), the condenser 26 is an apparatus for securing electrical capacity, and the high temperature radiator 28 is an apparatus for releasing heat of high temperature coolant flowed via an engine E into the air. In addition, the turbochargers 42 and 44 are adapted to drive turbines by inhaling exhaust gas or exterior air, and supply compressed air having a high temperature to cylinders of the engine E for increasing output of the engine E. Further, when air density becomes high, intake efficiency of the cylinder, combustion efficiency, and fuel efficiency of the engine are improved, and carbon dioxide production is simultaneously decreased as the intercooler 30 cools the high temperature air compressed for the turbochargers 42 and 44.

For a vehicle, the intercooler 30, the condenser 26, the high temperature radiator 28, and the turbochargers 42 and 44 are well-known to a person of ordinary skill in the art, so a detailed description thereof will be omitted.

The air ducts 10 and 11 are formed at respective sides of the exterior air intake port 22. That is, the cooling system 1 includes at least two air ducts 10 and 11. FIG. 1 shows two air ducts 10 and 11. Herein, one of the two air ducts 10 and 11 will be called "first air duct 10", and the other one of the two air ducts 10 and 11 will be called "second air duct 11".

The first and second air ducts 10 and 11 respectively include a front duct 12, a rear duct 14, and a duct outlet 16.

The front duct 12 is a portion which is formed relatively forward of the first and second air ducts 10 and 11 so as to take in exterior air in front of a vehicle. In addition, the front duct 12 is formed to become gradually more bent to the inside of the vehicle toward the front direction of a vehicle such that an extension line of the front duct 12 of the first air duct 10 and an extension line of the front duct 12 of the second air duct 11 form a streamlined shape in front of the vehicle. Further, as the front duct 12 forms a streamlined shape, resistance of the air may be minimized. Therefore, the front duct 12 can smoothly take in exterior air in front of a vehicle at both sides of the exterior air intake port 22. That is, aerodynamic performance of air passing through the front duct 12 is improved.

The rear duct 14 is a portion which is formed relatively rearward at the first and second air ducts 10 and 11 such that air flowing via the front duct 12 passes therein. In addition, the rear duct 14 is formed to become gradually more bent to the outside of a vehicle toward the rear direction of the vehicle such that an extension line of the rear duct 14 of the first air duct 10 and an extension line of the rear duct 14 of the second air duct 11 form a streamlined shape in front of the vehicle. Further, the rear duct 14 bent to the outside of the vehicle is directed to a wheel W. That is, the rear duct 14 minimizes resistance of the air and guides air flow toward the wheel W. Herein, the wheel W is naturally a front wheel.

The duct outlet 16 is formed such that air flowing via the rear duct 14 passes therein. In addition, the duct outlet 16 is adapted such that air flows out from the first and second air ducts 10 and 11. A guide plate 18 disposed at the duct outlet 16 so as to guide air flow toward the wheel W.

The guide plate 18 guides a flow direction of air flowing out through the duct outlet 16. The duct outlet 16 is integrally formed with a wheel house 24. That is, the guide plate 18 is mounted at the wheel house 24. Herein, the wheel house 24 is a part of a vehicle body, and covers the wheel W.

The guide plate 18 guides a flow direction of the air such that air flowed out through the duct outlet 16 forms an air curtain in front of the wheel W. In addition, the guide plate 18 is provided such that the air which forms the air curtain in front of the wheel W is directed by a set angle (a) to the side surface of the wheel W. Further, the set angle (a) may predetermined by a person of ordinary skill in the art for maximizing effect of an air curtain.

In FIG. 1, a width direction adjoint line L1 and a length direction adjoint line L2 of the vehicle body are illustrated for visually showing the set angle (a) at which air is directed to the side surface of the wheel W. In other words, FIG. 1 shows that the width direction adjoint line L1 of the vehicle body perpendicularly crosses the length direction adjoint line L2 of the vehicle body and the direction to which air is directed to the side surface of the wheel W and the length direction adjoint line L2 forms an included angle being the set angle (a).

Low temperature radiators 20 and 21 or an oil cooler 60 may be disposed in the interior of the first and second air ducts 10 and 11. In addition, the low temperature radiators 20 and 21 or the oil cooler 60 function by using air passing through the first and second air ducts 10 and 11. Herein, the low temperature radiators 20 and 21 are apparatuses for separately releasing remaining heat of a low temperature coolant after passing through the high temperature radiator 28. In addition, the oil cooler 60 is an apparatus which cools engine oil for maintaining temperature of engine oil at an appropriate temperature. The low temperature radiators 20 and 21 and the oil cooler 60 are well-known to a person of ordinary skill in the art, so a detailed description thereof will be omitted.

Meanwhile, the intercooler 30 is a water-cooled type or an air-cooled type according to the type of cooling. As described above, the intercooler 30 is an air-cooled type.

In case that the air-cooled type intercooler 30 is disposed in front of the engine E, it is cooled first by exterior air. Therefore, cooling efficiency of the intercooler 30 can be improved at a low speed low load of the engine E such that the engine E cooling and reactivity of the intercooler 30 are not required very much. On the other hand, in a high load state of the engine E, the engine cooling performance may be deteriorated as flow of exterior air is disturbed by interference of the intercooler 30. Particularly, responsiveness of the intercooler 30 may be deteriorated because a length of the pipe which connects the intercooler 30 to the engine E and the turbochargers 42 and 44 is long in the high speed high load of the engine E.

Referring to FIG. 2 to FIG. 5, cooling systems 2, 3, 4, and 5 in which the air-cooled type of intercooler 30 disposed in front of the engine E is removed, and water-cooled intercoolers 32 and 34 are disposed according to exemplary embodiments of the present invention will be described in detail.

In the description regarding the cooling systems 2, 3, 4, and 5 in which the water-cooled type of intercoolers 32 and 34 are disposed according to exemplary embodiments of the present invention, repeated descriptions regarding the constituent elements that are the same as in the cooling system 1 which is illustrated in FIG. 1 will be omitted.

Exterior air flowing into a vehicle body is indicated by dotted line arrows, coolant flow is indicated by alternated long and short dash line arrows, and compressed air flowed via the turbochargers 42 and 44 is indicated by solid line arrows in FIG. 2 to FIG. 5.

Figure 2:
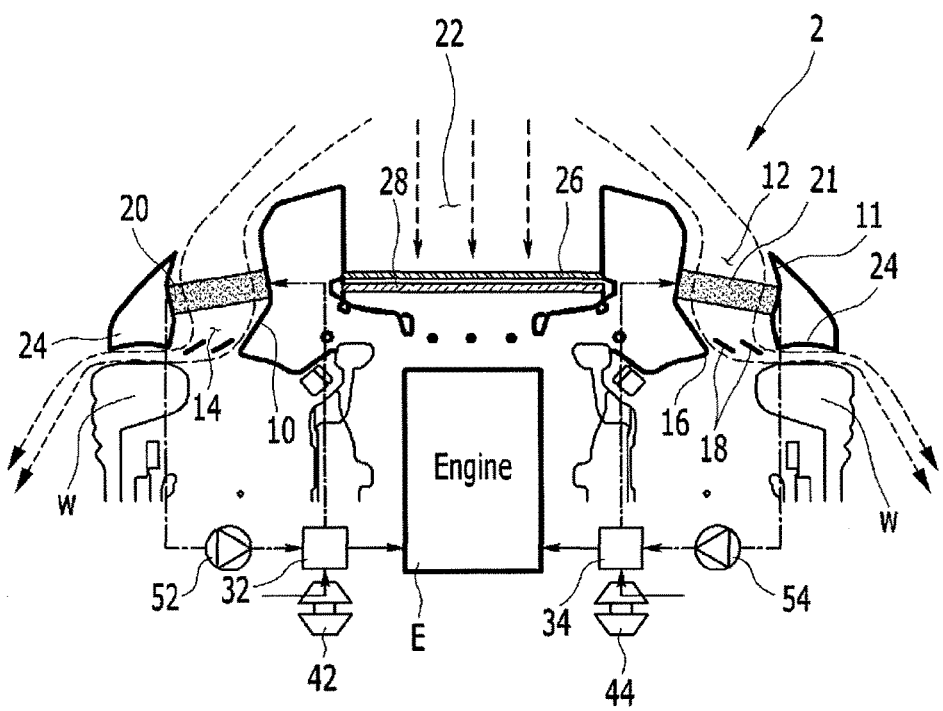
FIG. 2 is a schematic diagram of a cooling system according to various exemplary embodiments of the present invention.

FIG. 2 is a schematic diagram of a cooling system according to a first exemplary embodiment of the present invention.

As shown in FIG. 2, a cooling system 2 according to the first exemplary embodiment of the present invention includes a first low temperature radiator 20, a second low temperature radiator 21, a first intercooler 32, a second intercooler 34, a first turbocharger 42, a second turbocharger 44, a first water pump 52, and a second water pump 54.

The low temperature radiators 20 and 21 are respectively disposed inside of the first air duct 10 and the second air duct 11, and the water-cooled intercoolers 32 and 34, the turbochargers 42 and 44, and the water pumps 52 and 54 are respectively disposed at the rear of the first air duct 10 and the second air duct 11.

The first low temperature radiator 20 is the low temperature radiator 20 which is disposed inside of the first air duct 10.

The second low temperature radiator 21 is the low temperature radiator 21 which is disposed inside of the second air duct 11.

The first intercooler 32 is the water-cooled type intercooler 32 which is disposed in the rear of the first air duct 10.

The second intercooler 34 is the water-cooled type intercooler 32 which is disposed in the rear of the second air duct 11.

The first turbocharger 42 is the turbocharger 42 which is disposed in the rear of the first air duct 10.

The second turbocharger 44 is the turbocharger 44 which is disposed in the rear of the second air duct 11.

The first water pump 52 is the water pump 52 which is disposed in the rear of the first air duct 10.

The second water pump 54 is the water pump 54 which is disposed in the rear of the second air duct 11.

In the cooling system 2 according to the first exemplary embodiment of the present invention, coolant repeatedly flows via the first low temperature radiator 20 and the first intercooler 32, and it is separated by circulation of coolant for cooling the engine E. In addition, coolant repeated flows via the second low temperature radiator 21 and the second intercooler 34, and it is separated by circulation of coolant which flows via the first low temperature radiator 20 and the first intercooler 32.

The first water pump 52 is disposed between the first low temperature radiator 20 and the first intercooler 32. In addition, the first water pump 52 pumps coolant flowing via the first low temperature radiator 20 so as to supply it to the first intercooler 32, and realizes the repeated circulation of coolant which flows via the first low temperature radiator 20 and the first intercooler 32.

In the circulation of the coolant, coolant flowing via the first low temperature radiator 20 heat-exchanges with air passing through the first air duct 10, and this coolant, which is cooled by heat-exchanging with air passing through the first air duct 10, is supplied to the first intercooler 32.

Meanwhile, high temperature compressed air generated from the first turbocharger 42 flows via the first intercooler 32, and is supplied to the engine E. Therefore, high temperature compressed air generated from the first turbocharger 42 heat-exchanges with coolant supplied to the first intercooler 32, and this compressed air, which is cooled by heat-exchanging with coolant supplied to the first intercooler 32, is supplied to the engine E. Further, coolant of which the temperature became high by heat-exchanging with high temperature compressed air generated from the first turbocharger 42 is cooled again by flowing via the first low temperature radiator 20.

The second water pump 54 is disposed between the second low temperature radiator 21 and the second intercooler 34. The second water pump 54 pumps coolant flowing via the second low temperature radiator 21 so as to supply the second intercooler 34, and realizes the repeated circulation of coolant which flows via the second low temperature radiator 21 and the second intercooler 34.

In the circulation of coolant, coolant flowing via the second low temperature radiator 21 heat-exchanges with air passing through the second air duct 11, and this coolant, which is cooled by heat-exchanging with air passing through the second air duct 11, is supplied to the second intercooler 34.

Meanwhile, high temperature compressed air generated from the second turbocharger 44 flows via the second intercooler 34 so as to be supplied to the engine E. Therefore, high temperature compressed air generated from the second turbocharger 44 heat-exchanges with coolant supplied to the second intercooler 34, and this compressed air, which is cooled by heat-exchanging with coolant supplied to the second intercooler 34, is supplied to the engine E. Further, coolant of which the temperature became high by heat-exchanging with high temperature compressed air generated from the second turbocharger 44 is cooled again by flowing via the second low temperature radiator 21.

Figure 3:
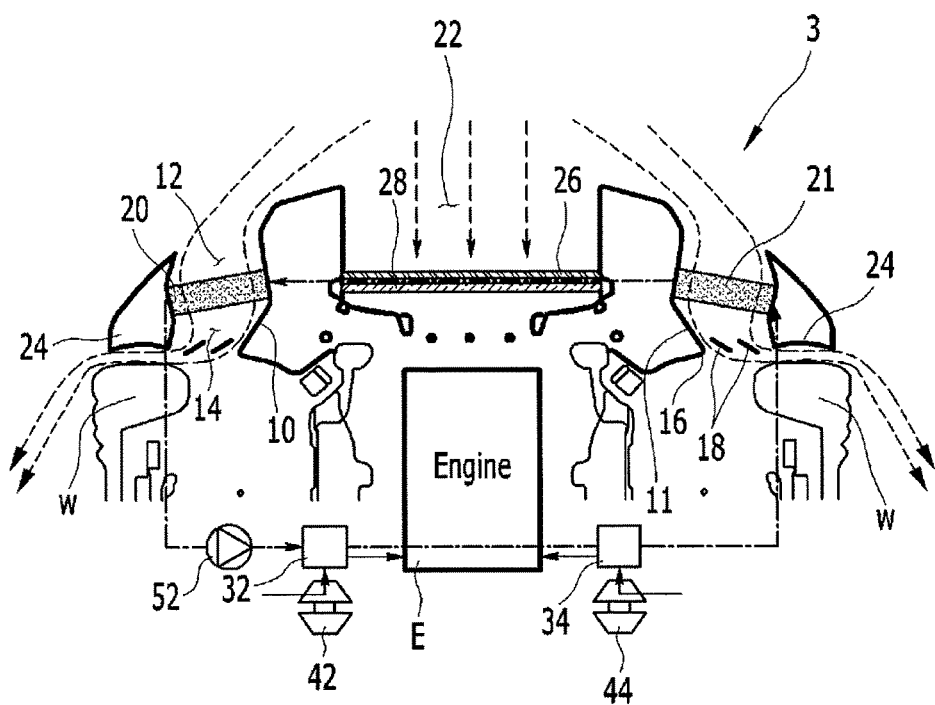
FIG. 3 is a schematic diagram of a cooling system according to various exemplary embodiments of the present invention.
Figure 4:
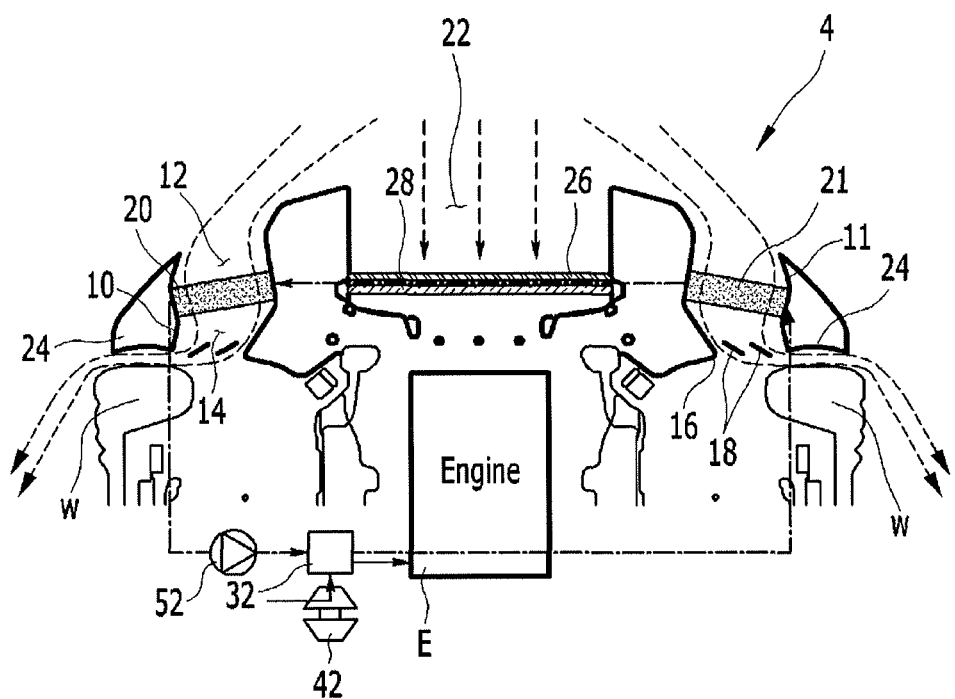
FIG. 4 is a schematic diagram of a cooling system according to various exemplary embodiments of the present invention.

FIG. 3 is a schematic diagram of a cooling system according to a second exemplary embodiment of the present invention, and FIG. 4 is a schematic diagram of a cooling system according to a third exemplary embodiment of the present invention.

In the descriptions regarding the cooling system 3 according to the second exemplary embodiment of the present invention and the cooling system 4 according to the third exemplary embodiment of the present invention, repeated descriptions regarding the constituent elements that are the same as in the cooling system 2 which is illustrated in FIG. 2 according to the first exemplary embodiment of the present invention will be omitted.

As shown in FIG. 3, coolant repeated circulates to sequentially pass through the first low temperature radiator 20, the first intercooler 32, the second intercooler 34, and the second low temperature radiator 21, and it is separated by circulation of coolant for cooling the engine E in the cooling system 3 according to the second exemplary embodiment of the present invention. The circulation of coolant may be realized by one of water pumps 52 and 54.

In other words, the circulation of coolant which is additionally performed with circulation of coolant for cooling the engine E in the cooling system 3 according to the second exemplary embodiment of the present invention is different when compared with the cooling system 2 according to the first exemplary embodiment of the present invention, and one of the first water pump 52 and the second water pump 54 may be removed.

While it is shown that the second water pump 54 is removed and the first water pump 52 is provided in FIG. 3, it is not limited thereto in the disclosed embodiment.

As shown in FIG. 4, coolant repeatedly circulates to sequentially pass through the first low temperature radiator 20, the first intercooler 32, and the second low temperature radiator 21, and it is separated by circulation of coolant for cooling the engine E in the cooling system 4 according to the third exemplary embodiment of the present invention.

In the cooling system 4 according to the third exemplary embodiment of the present invention realizing the circulation of coolant, only one of the water pumps 52 and 54 is required, as in the cooling system 3 according to the second exemplary embodiment of the present invention. In addition, one of the first intercooler 32 and the second intercooler 34 is removed compared with the cooling system 3 according to the second exemplary embodiment of the present invention in the cooling system 4 according to the third exemplary embodiment of the present invention. Further, one of the first turbocharger 42 and the second turbocharger 44 is removed when one of the intercoolers 32 and 34 is removed.

While it is shown that the second intercooler 34 and second turbocharger 44 are removed and the first intercooler 32 and the first turbocharger 42 are provided in FIG. 4, it is not limited thereto in the disclosed embodiment.

If the two intercoolers 32 and 34 are provided as the cooling system 3 according to the second exemplary embodiment of the present invention, the temperature of the coolant passing through the first intercooler 32 becomes excessive to some degree, and thus the performance when coolant heat-exchanges with compressed air in the second intercooler 34 may be deteriorated. Therefore, it may be efficient to only provide the first intercooler 32 and the first turbocharger 42 as the cooling system 4 according to the third exemplary embodiment of the present invention. It may be required to increase capacity of the first intercooler 32 and the first turbocharger 42 and improve performance thereof when only the first intercooler 32 and the first turbocharger 42 are provided.

Coolant which is circulated to be distinguished from coolant for cooling the engine E may pass through the high temperature radiator 28 between the second low temperature radiator 21 and the first low temperature radiator 20 in the cooling system 3 and the cooling system 4 according to the second and third exemplary embodiments of the present invention. In this case, coolant for cooling the engine E flows via the high temperature radiator 28 and simultaneously heat-exchanges with the coolant which is delivered from the second low temperature radiator 21 to the first low temperature radiator 20 via the high temperature radiator 28. Therefore, cooling efficiency of coolant for cooling the engine E can be improved. Further, the coolant for cooling the engine E and the coolant which is circulated to be distinguished with coolant for cooling the engine E are cooled by air passing through the exterior air intake port 22 while passing the high temperature radiator 28.

Figure 5:
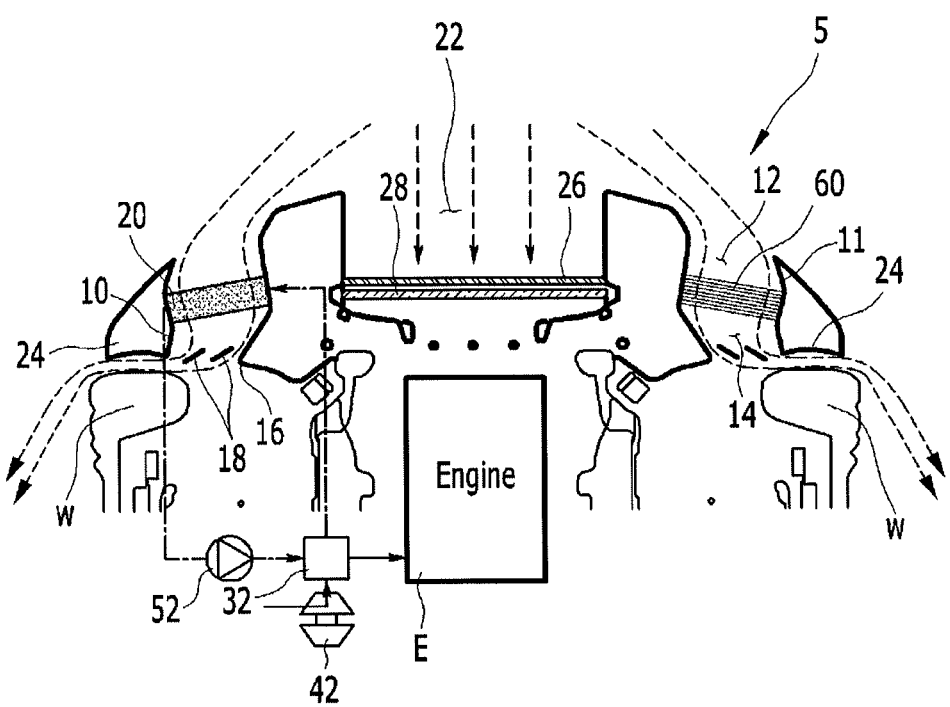
FIG. 5 is a schematic diagram of a cooling system according to various exemplary embodiments of the present invention.

FIG. 5 is a schematic diagram of a cooling system according to a fourth exemplary embodiment of the present invention.

As shown in FIG. 5, a cooling system 5 according to the fourth exemplary embodiment of the present invention includes an oil cooler 60.

The oil cooler 60 is disposed inside of one of the first air duct 10 and the second air duct 11. In addition, the first low temperature radiator 20, the first intercooler 32, the first turbocharger 42, and the first water pump 52 are removed or the second low temperature radiator 21, the second intercooler 34, the second turbocharger 44, and the second water pump 54 are removed compared with the cooling system 2 according to the first exemplary embodiment of the present invention in the cooling system 5 according to the fourth exemplary embodiment of the present invention.

While it is shown that the second low temperature radiator 21, the second intercooler 34, the second turbocharger 44, and the second water pump 54 are removed according to the oil cooler 60 is disposed inside of the second air duct 10 in FIG. 5, it is not limited thereto in the disclosed embodiment.

It may be required to increase capacity of the first intercooler 32 and the first turbocharger 42 and improve performance thereof in the cooling system 5 according to the fourth exemplary embodiment of the present invention when only the first intercooler 32 and the first turbocharger 42 are provided, the same as with the cooling system 4 according to the third exemplary embodiment of the present invention.

According to an exemplary embodiment of the present invention, cooling performance by air passing through the air ducts 10 and 11 can be improved as the air ducts 10 and 11 are formed so as to minimize resistance of air flow. In addition, aerodynamic performance can be better as the duct outlet 16 is formed such that performance of air passing through the air duct 10 and 11 and forming an air curtain in front of the wheel W is improved. Further, various compositions can be realized according to the oil cooler 60 or the radiator 20 being disposed at the air ducts 10 and 11. In a high load state of the engine E, cooling performance can be improved by disposing the intercoolers 30, 32, and 34 and circulating coolant, and therefore fuel consumption may be better.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cooling system for a vehicle, comprising:
   at least two air ducts formed at respective sides of an exterior air intake port taking in an exterior air in front of the vehicle to an engine compartment, and taking in the exterior air in front of the vehicle to flow the exterior air out toward a wheel;
   a first low temperature radiator disposed inside of one of the at least two air ducts and adapted to release heat of a coolant into the air;
   a second low temperature radiator disposed inside of the other of the at least two air ducts and adapted to release heat of the coolant into the air;
   a turbocharger generating a compressed air to supply the compressed air to an engine; and
   an intercooler cooling the compressed air generated from the turbocharger by using coolant flowed via at least one of the first and second low temperature radiators,
   wherein coolant flowing via the first and second low temperature radiators heat-exchanges with air passing through the air duct in which the first and second low temperature radiators are respectively disposed,
   wherein repeated circulation of coolant which sequentially passes through the first low temperature radiator, the intercooler, and the second low temperature radiator is realized, and
   wherein coolant sequentially passing through the first low temperature radiator, the intercooler, and the second low temperature radiator flows via a high temperature radiator which is disposed at the exterior air intake port and is adapted to release heat of coolant for cooling the engine into the air, and heat-exchanges with air passing through the exterior air intake port and coolant for cooling the engine.

2. The cooling system of claim 1, wherein the intercooler includes a first intercooler and a second intercooler, and repeated circulation of coolant which circulates via the first low temperature radiator and the first intercooler and repeated circulation of coolant which circulates via the second low temperature radiator and the second intercooler are independently realized.

3. The cooling system of claim 2, further comprising:
   a first water pump pumping coolant flowing via the first low temperature radiator to be supplied to the first intercooler to realize the repeated circulation of the coolant which circulates via the first low temperature radiator and the first intercooler; and a second water pump pumping the coolant flowing via the second low temperature radiator to be supplied to the second intercooler to realize the repeated circulation of coolant which circulates via the second low temperature radiator and the second intercooler.

4. The cooling system of claim 1, wherein the intercooler includes at least two intercoolers, and the repeated circulation of coolant which sequentially passes through the first low temperature radiator, the at least two intercoolers, and the second low temperature radiator is realized.

5. The cooling system of claim 4, further comprising a water pump pumping coolant flowing via the first low temperature radiator to be supplied to one of the at least two intercoolers to realize the repeated circulation of coolant which passes through the first low temperature radiator, the at least two intercoolers, and the second low temperature radiator.

6. The cooling system of claim 5, wherein coolant sequentially passing through the first low temperature radiator, the at least two intercoolers, and the second low temperature radiator flows via a high temperature radiator which is disposed at the exterior air intake port and is adapted to release heat of coolant for cooling the engine into the air, and heat-exchanges with air passing through the exterior air intake port and coolant for cooling the engine.

7. A cooling system for a vehicle, comprising:

at least two air ducts formed at respective sides of an exterior air intake port taking in an exterior air in front of the vehicle to an engine compartment, and taking in the exterior air in front of the vehicle to flow out the exterior air toward a wheel;

a low temperature radiator disposed inside of one of the at least two air ducts and adapted to release heat of coolant into the air;

an oil cooler disposed inside of the other one of the at least two air ducts and adapted such that engine oil is cooled by passing therethrough;

a turbocharger generating compressed air to supply the compressed air to the engine; and an intercooler cooling the compressed air generated from the turbocharger by using coolant flowing via the low temperature radiator, wherein coolant, which flows via the low temperature radiator, heat-exchanges with air passing through the one air duct in which the low temperature radiator is disposed, and oil, which flows via the oil cooler, heat-exchanges with air passing through the other air duct in which the oil cooler is disposed.

8. The cooling system of claim 7, wherein a repeated circulation of coolant which flows via the low temperature radiator and the intercooler is realized.

9. The cooling system of claim 8, wherein further comprising a water pump pumping coolant flowed via the low temperature radiator to be supplied to the intercooler to realize the repeated circulation of coolant which flows via the low temperature radiator and the intercooler.

* * * * *